United States Patent
Hermansson

(10) Patent No.: US 10,975,911 B2
(45) Date of Patent: Apr. 13, 2021

(54) HYDROSTATIC BEARING FOR SUPPORTING A TELESCOPE

(71) Applicant: Aktiebolaget SKF, Gothenburg (SE)

(72) Inventor: Joakim Hermansson, Dejaersjoe (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/891,197

(22) Filed: Jun. 3, 2020

(65) Prior Publication Data

US 2020/0291997 A1 Sep. 17, 2020

Related U.S. Application Data

(63) Continuation of application No. 15/303,134, filed as application No. PCT/SE2015/050393 on Mar. 31, 2015, now abandoned.

(30) Foreign Application Priority Data

Apr. 10, 2014 (SE) .................................... 1400196-0

(51) Int. Cl.
- *F16C 32/06* (2006.01)
- *F16C 39/02* (2006.01)
- *F16C 39/04* (2006.01)

(52) U.S. Cl.
CPC ........ *F16C 32/067* (2013.01); *F16C 32/0677* (2013.01); *F16C 39/02* (2013.01); *F16C 39/04* (2013.01); *F16C 2300/14* (2013.01); *F16C 2370/20* (2013.01)

(58) Field of Classification Search
CPC .............. F16C 32/0662; F16C 32/0666; F16C 32/0677; F16C 32/0681; F16C 32/0685; F16C 32/0692; F16C 32/0696; F16C 39/02; F16C 39/04; F16C 39/06; F16C 39/063; F16C 39/066; F16C 17/03; F16C 17/035;

(Continued)

(56) References Cited

U.S. PATENT DOCUMENTS

| | | |
|---|---|---|
| 3,675,977 A | 7/1972 | Arsenius et al. |
| 3,752,542 A | 8/1973 | Kraus |
| 3,791,703 A | 2/1974 | Ifield |

(Continued)

FOREIGN PATENT DOCUMENTS

GB 1385510 A 2/1975

OTHER PUBLICATIONS

HydrostaticShoeBearingArrangements_SKF_3873 E.

*Primary Examiner* — James Pilkington
(74) *Attorney, Agent, or Firm* — Garcia-Zamor Intellectual Property Law; Ruy Garcia-Zamor; Bryan Peckjian

(57) ABSTRACT

A hydrostatic bearing is provided which may include foot part supporting a load-carrying unit, a head part, and body part forming a lower chamber and an upper chamber. A lower member is supported by the load-carrying unit and arranged inside the lower chamber. An upper member is controllable by a pressurizing fluid and arranged inside the upper chamber. The lower member is controllably moveable along a central axis of the hydrostatic bearing between a retracted state, where the lower member is distanced from the upper member, and an extended state, where the lower member is also in contact with the upper member. The hydrostatic bearing acts both as a conventional slave bearing and a conventional master bearing.

11 Claims, 2 Drawing Sheets

(58) Field of Classification Search
CPC .... F16C 17/06; F16C 17/065; F16C 2240/70; F16C 2370/20
See application file for complete search history.

(56) References Cited

U.S. PATENT DOCUMENTS

| | | | |
|---|---|---|---|
| 4,113,325 A | | 9/1978 | Miller |
| 4,174,136 A | | 11/1979 | Hallstedt |
| 4,310,204 A | * | 1/1982 | Christ .................. F16C 32/0666 384/106 |
| 4,704,879 A | * | 11/1987 | Christ .................... F16C 32/067 68/140 |
| 6,276,491 B1 | * | 8/2001 | Schonfeld ............. F16C 29/025 137/501 |
| 8,328,423 B2 | | 12/2012 | Tomelleri |
| 2010/0329593 A1 | | 12/2010 | Tomelleri |

\* cited by examiner

HYDROSTATIC BEARING FOR SUPPORTING A TELESCOPE

CROSS REFERENCE

This application claims priority to and benefit of the following applications, as follows: this application is a continuation of and claims priority to and benefit of U.S. patent application Ser. No. 15/303,134 (a United States National Stage Application) filed on Oct. 10, 2016, which claims priority to and benefit of International Application Number PCT/SE2015/050393 filed on Mar. 31, 2015, which claims priority to and benefit of Sweden Patent Application 1400196-0 filed on Apr. 10, 2014; each of the above identified applications is hereby incorporated herein by reference herein as if fully set forth in its entirety.

FIELD OF THE INVENTION

The present invention relates to a hydrostatic bearing for supporting a telescope.

BACKGROUND OF THE INVENTION

A structure of large dimensions, such as a large telescope having a diameter e.g. in the range of from 10 m to 60 m, a large antenna, a debarking drum, and a grinding mill, may advantageously be supported and/or guided hydrostatically. Hydrostatic bearings are suitable for this kind of applications as they may operate on raceways of an unlimited size, support high loads and generally allow for low sliding friction.

In a large telescope, load variations should be kept low, and preferably be avoided, in order to provide an operation mode as accurate and smooth as possible. Conventionally, large telescopes are often provided with a higher number of hydrostatic bearings than theoretically needed in order to ensure satisfying distribution of load.

However, over-dimensioned bearing designs often lead to statically undetermined load sharing between the bearings. Statically undetermined load sharing makes the bearings sensitive to e.g. structural deflections, structural temperature variations, manufacturing tolerances of the raceways and mounting errors.

A conventional bearing design typically includes a mix of hydrostatic bearings having static stiffness (also called e.g. master bearings) and hydrostatic bearings having no static stiffness (also called e.g. slave bearings) allowing for a system with both static and dynamic rigidity, thereby improving load sharing and eigen frequency properties of the telescope structure. However, this design implies disadvantages when the system is shut off, since only the bearings having static stiffness are load-carrying in a non-operating state.

Thus, there is still a need in the art to provide an improved and/or alternative bearing design which enables a good load sharing between individual bearings both during operation and when the system is shut off.

BRIEF SUMMARY OF THE INVENTION

It is an object of the present invention to at least partly overcome the problems in the prior art.

The present invention is based on the idea to combine a so-called slave bearing and a so-called master bearing into a single hydrostatic bearing capable of switching between two modes corresponding to one type of bearing each. Due to a two-part member of the hydrostatic bearing of the present invention, the hydrostatic bearing may switch between a mode where the two parts of the two-part member are in contact with each other, i.e. in a so-called extended state, and a mode where the two parts of the two-part member are distanced from each other, i.e. in a so-called a retracted state.

In the retracted state, a hydraulic system is active (i.e. switched on) and the hydrostatic bearing works as a so-called slave bearing having no static stiffness. Advantages of a slave bearing is its adaptive nature with regard to irregularities in a track of the structure that it is supporting and its ability to keep a constant load also in the presence of such irregularities. The hydrostatic bearing of the present invention is typically in the mode of the retracted state during operation.

In the extended state, the hydraulic system is passive (i.e. switched off) and the hydrostatic bearing works as a so-called master bearing having static stiffness. Advantages of a master bearing is its independence of an energy-intensive hydraulic system to support. The hydrostatic bearing of the present invention is typically in the mode of the extended state when not in operation.

Thus, the hydrostatic bearing according to the present invention allows for satisfying load sharing between the individual hydrostatic bearings both during operation and when the system is shut off. Further, the hydrostatic bearing according to the present invention possesses the advantages of both a slave bearing and a master bearing.

According to a first aspect, the present invention relates to a hydrostatic bearing for supporting a telescope. The hydrostatic bearing provides a foot part, a head part and a body part. The foot part supports a load-carrying unit. The head part has a first surface adapted to receive an external load and a second surface arranged opposite to the first surface. The body part is arranged in between the foot part and the head part. The body part forms a lower chamber and an upper chamber. The upper chamber is provided with an inlet for a pressurizing fluid. A lower member is supported by the load-carrying unit and arranged inside the lower chamber. The lower member provides a first end surface facing away from the load-carrying unit and a second end surface facing the load-carrying unit. An upper member is controllable by the pressurizing fluid and arranged inside the upper chamber. The upper member provides a first end surface facing the second surface of the head part and a second end surface facing the first end surface of the lower member. The lower member is controllably moveable along a central axis between a retracted state, where the first end surface of the lower member is distanced from the second end surface of the upper member, and an extended state, where the first end surface of the lower member is in contact with the second end surface of the upper member.

Thus, the "two-part member" of the hydrostatic bearing, referred to above, consists of the upper member and the lower member.

Generally, the second end surface of the lower member is in contact with the load-carrying unit. Generally, the first end surface of the upper member is in contact with the second surface of the head part.

The lower member is controllably moveable along the central axis. The lower member may not be moveable in the radial direction perpendicular to the central axis. The lower member is typically not rotatably moveable about the central axis.

The upper member is typically not moveable along the central axis. The upper member may not be moveable in the radial direction perpendicular to the central axis. The upper member is typically not rotatably moveable about the central axis.

According to an embodiment, the lower member provides a lower hydraulic piston compressing the load-carrying unit when the lower member is in its retracted state. The lower hydraulic piston may compress the load-carrying unit by means of the pressurizing fluid.

According to an embodiment, the upper member provides an upper hydraulic piston supporting the applied external load when the lower member is in its retracted state. The upper hydraulic piston may support an external load by means of the pressurizing fluid when the lower member is in its retracted state. The pressurizing fluid may typically be supplied via the inlet for pressurizing fluid of the upper chamber.

According to an embodiment, the head part further provides a main recess for lubricating fluid being arranged on the first surface of the head part. The main recess serves to form a lubricating film upon the first surface of the head part during operation.

According to an embodiment the hydrostatic bearing further provides a pump for supplying lubricating fluid to the main recess.

According to an embodiment, the pump is arranged in the head part. The pump may for instance be integrated in the head part. Alternatively, the pump is arranged externally from the head part and fluidly connected to the main recess.

According to an embodiment, the head part further provides at least one sub-recess being connected to the main recess via a flow restrictor for adjusting a flow of lubricating fluid between the main recess and the at least one sub-recess, wherein the at least one sub-recess also is arranged on the first surface of the head part. Typically, one flow restrictor is arranged between the main recess and each of the sub-recesses. As an example, a hydrostatic bearing comprising four sub-recesses provides four flow restrictors.

The main recess, together with sub-recesses, serve to adapt the lubricating film formed upon the first surface of the head part during operation in order to parry variations in the external load. The arrangement of a main recess and sub-recesses allows for self-alignment serving to provide a lubricating film being as uniform as possible with regard to thickness. The adaptiveness due to the recesses helps avoiding disruptions in the operation of a telescope which the hydrostatic bearing is supporting. The flow restrictor may for instance adapt the flow of lubricating fluid from the main recess to any of the sub-recesses to the external load.

According to an embodiment, the head part provides four sub-recesses being symmetrically arranged about the main recess. A symmetrical arrangement may further improve a bearing design serving to minimize disruptions in the operation of the telescope e.g. due to vibrations.

According to an embodiment, the lower chamber is also provided with an inlet for a pressurizing fluid. Thus, pressurizing fluid may typically be supplied to the lower chamber, e.g. to the lower hydraulic piston, via the inlet for pressurizing fluid.

According to an embodiment, the inlet for a pressurizing fluid of the lower chamber is fluidly connected to the inlet for a pressurizing fluid of the upper chamber. By allowing the inlet of the lower chamber to be fluidly connected with the inlet of the upper chamber, the upper member (typically comprising the upper piston) and the lower member (typically comprising the lower piston) may be jointly controllable.

According to an embodiment, the load-carrying unit consists of mechanical springs and/or an electro-mechanical actuator. The load-carrying unit is generally of a compressible nature. Due to its compressible nature, the height of the load-carrying unit measured along the central axis A may vary, thereby allowing the lower member to move between its retracted state and its extended state.

According to another aspect, the present invention provides a telescope arrangement comprising at least one hydrostatic bearing according to any embodiment of the present invention.

By the term "hydrostatic bearing" is meant a bearing in which loaded surfaces may be separated by a fluid film which is forced between them by an externally generated pressure. The formation of the fluid film typically requires a supply pump to operate.

By the term "master hydrostatic bearing" or "master bearing" is meant a hydrostatic bearing being fixedly supported and having static stiffness.

By the term "slave hydrostatic bearing" or "slave bearing" is meant a hydrostatic bearing being piston-supported and having no static stiffness. A slave bearing may also be referred to as a force-controlled bearing.

By the term "flow restrictor" is meant a component in which an inlet pressure, e.g. a supply pressure, is dropped to a lower outlet pressure, e.g. a side recess pressure. The flow restrictor may for instance provide an orifice or a capillary.

By the term "lubricating fluid" is herein meant a fluid being supplied to the bearing to form a fluid film between loaded surfaces. The fluid may be either a liquid, such as a hydrocarbon oil, or a gas, such as air. Typically, in a hydrostatic bearing, the lubricating fluid is a hydrocarbon oil.

By the term "pressurizing fluid" is herein meant a fluid being supplied to the bearing to activate at least one of the upper member, typically comprising an upper hydraulic piston, and the lower member, typically comprising a lower hydraulic piston. The pressurizing fluid may, for instance, be a hydraulic oil, such as a hydrocarbon oil, such as a mineral hydrocarbon oil or a synthetic hydrocarbon oil.

BRIEF DESCRIPTION OF THE SEVERAL VIEWS OF THE DRAWING

These and other aspects of the present invention will now be described in more detail, with reference to the appended drawings showing embodiments of the invention.

DETAILED DESCRIPTION OF THE INVENTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
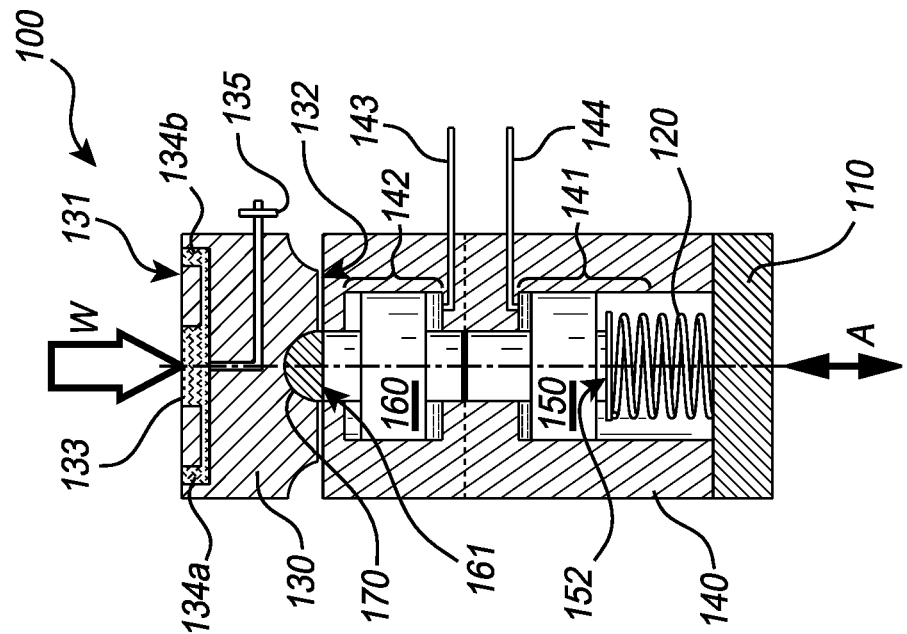
FIG. 1 shows a hydrostatic bearing according to an embodiment of the present invention in a cross-sectional side view, wherein the hydrostatic bearing provides a lower member positioned in its retracted state.
Figure 2:
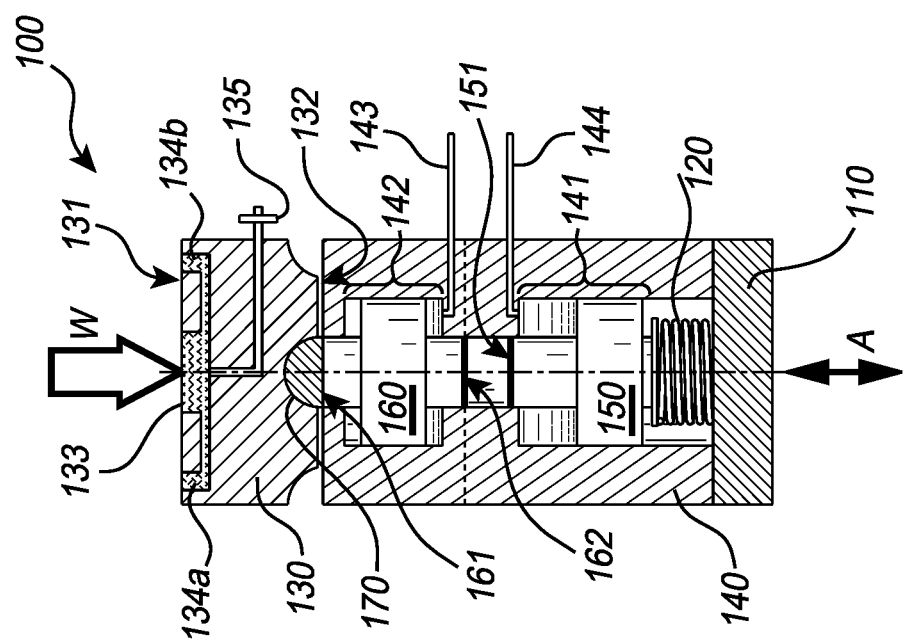
FIG. 2 shows the hydrostatic bearing of FIG. 1, however, having its lower member positioned in its extended state instead of in its retracted state.

The present invention relates to a hydrostatic bearing for supporting a telescope, and the hydrostatic bearing according to an embodiment of the present invention will hereafter be described more in detail with reference to FIGS. 1-2. The hydrostatic bearing is in FIGS. 1-2 shown in a cross-sectional side view.

The hydrostatic bearing 100, shown in FIGS. 1-2, provides a head part 130, a foot part 110 and a body part 140. The latter one 140 being arranged in between the two former ones 130, 110.

The head part 130 has a first surface 131 adapted to receive an external load W and a second surface 132. The second surface is arranged opposite to the first surface. The head part 130 may be made of a material selected from the group consisting of: metals, plastics, and composites thereof. For example, the head part may be made of steel. The material is typically a durable material able to support applied loads satisfyingly. During operation, the first surface 131 is typically at least partly covered by a lubricating film, such as an oil film.

The head part 130 may be supported by a half-spherical ball 170, as shown in FIGS. 1-2. The half-spherical ball allows for self-alignment. However, the person skilled in the art knows that alternative solutions for support and self-alignment available in the state of the art may also be used.

Herein, the head part 130 further provides a main recess 133 for lubricating fluid. The main recess 133 is arranged on the first surface 131 of the head part 130 and has a depth as seen in the axial direction along the central axis being smaller than the height of the head part as seen in the axial direction along the central axis. Typically, the main recess 133 is arranged in the center of the first surface, such that a central axis A of the hydrostatic bearing 100 extends through the center of the main recess 133.

Herein, the head part 130 also further provides four sub-recesses (of which two 134a-b are shown in FIGS. 1-2). Each of the sub-recesses 134a-b is connected to the main recess 133 via a flow restrictor. The flow restrictors serve to adjust the flow of lubricating fluid between the main recess and each of the four sub-recesses. The flow restrictors are typically directly or indirectly dependent on the external load. The size of the flow restrictors may be dependent on the surface topology and the thickness of the film of lubricating fluid being formed on the first surface of the head part.

The main recess 133 is typically externally supplied with lubricating fluid, typically via a supply pump being fluidly connected to the main recess 133. In FIGS. 1-2, a pump 135, adapted to supply the main recess 133 with lubricating fluid, such as oil, is schematically shown. The pump 135 may either be integrated in the head part 130 or arranged externally from, but fluidly connected with, the head part 130 and the main recess 133. The pump 135 is typically an active pump, such as an electrical pump, which consequently may supply the main recess 133 with lubricating fluid during operation.

Similarly to the main recess 133, the sub-recesses 134a-b are also arranged on the first surface 131 of the head part 130. Each of the sub-recesses typically has a depth as seen in the axial direction along the central axis being smaller than the height of the head part as seen in the axial direction along the central axis. A lubricating film, such as an oil film, may be built up on the first surface 131 of the head part 130 via lubricating fluid from the main recess 133 and the sub-recesses 134a-b.

Preferably, and as shown in the FIGS. 1-2, the sub-recesses 134a-b are symmetrically arranged about the main recess 133, and consequently also symmetrically arranged about the central axis A of the hydrostatic bearing 100.

The foot part 110 is adapted to and arranged to support a load-carrying unit 120. The foot part 110 may be a solid piece of a material selected from the group consisting of: metals, plastics, and composites thereof. For example, the foot part may be made of steel. The load-carrying unit 120 may consist of mechanical springs and/or an electro-mechanical actuator. In FIGS. 1-2, the load-carrying unit 120 consists of mechanical springs (schematically shown). The load-carrying unit 120 is of a compressible nature. Due to its compressible nature, the height of the load-carrying unit 120 measured along the central axis A may vary.

The body part 140 is arranged between the foot part 110 and the head part 130. The body part 140 forms a lower chamber 141 and an upper chamber 142. The lower chamber 141 and the upper chamber 142 are typically of the same size. For instance, the volume of the lower chamber 141 is equal to the volume of the upper chamber 142. For instance, the projected surface area of the lower chamber 141 in the direction of the central axis A is equal to the projected surface area of the upper chamber 142 in the direction of the central axis A. A force working on the lower member 150 along the central axis A is preferably equal to a force working on the upper member 160 along the central axis A. The body part 140 may be made of a material selected from the group consisting of: metals, plastics, and composites. For example, the body part may be made of steel. The lower chamber 141 and the upper chamber 142, respectively, are typically cavities in the body part of a shape adapted to accommodate the lower member 150 and the upper member 160, respectively.

The lower chamber 141 is provided with an inlet 144 for a pressurizing fluid. The inlet 144 for a pressurizing fluid may also serve as a drainage outlet in case of overpressure inside the lower chamber 141. Further, the lower chamber is configured to provide a lower member 150. The lower member 150 is supported by the load-carrying unit 120, which is typically arranged in the bottom of the lower chamber 141.

The lower member 150 provides a first end surface 151 facing away from the load-carrying unit 120 and a second end surface 152, herein, being in contact with the load-carrying unit 120. The cross-sectional area (perpendicular to the central axis A) of the second end surface 152 is typically smaller than corresponding cross-sectional area of the load-carrying unit 120.

The upper chamber 142 is provided with an inlet 143 for a pressurizing fluid. The inlet 143 for a pressurizing fluid may also serve as a drainage outlet in case of overpressure inside the upper chamber 142. Further, the upper chamber is configured to provide an upper member 160. The upper member 160 is controllable by the pressurizing fluid. The upper member 160 provides a first end surface 161, herein, being in contact with the second surface 132 of the head part 130 and a second end surface 162 facing the first end surface 151 of the lower member 150.

The hydrostatic bearing of the present invention is characterized by its ability to shift between a mode where the lower member 150 and the upper member 160 are combined and jointly acts as a common member, and a mode where the lower member 150 and the upper member 160 are separated and works as separate members. This ability is due to that the lower member 150 is controllably moveable along the central axis A of the hydrostatic bearing between a retracted state (where the lower member 150 and the upper member 160 are distanced apart, shown in FIG. 1) and an extended state (where the lower member 150 and the upper member 160 are in contact, shown in FIG. 2).

In the retracted state, shown in FIG. 1, the first end surface 151 of the lower member 150 is distanced from the second end surface 162 of the upper member 160. In the retracted state, the hydrostatic bearing presents a divided member extending discontinuously along the central axis A through the upper chamber 142 and the lower chamber 141, respectively. In the retracted state, the hydrostatic bearing 100 typically serves as a so-called slave bearing.

In the retracted state, the upper member 160 and the lower member 150, respectively, are active.

The lower member 150, which herein provides a lower hydraulic piston, compresses the load-carrying unit 120 when the lower member is in its retracted state. The lower piston compresses the load-carrying unit 120 by means of the pressurizing fluid. The pressurizing fluid is typically supplied via the inlet 144 for pressurizing fluid.

The upper member 160, which herein provides an upper hydraulic piston, at least mainly, and typically entirely, supports the applied external load by means of the pressurizing fluid when the lower member is in its retracted state. The pressurizing fluid is typically supplied via the inlet 143 for pressurizing fluid.

In the extended state, shown in FIG. 2, the first end surface 151 of the lower member 150 is in contact with the second end surface 162 of the upper member 160. In the extended state, the hydrostatic bearing presents a complete member extending continuously along the central axis A through both the upper chamber 142 and the lower chamber 141. In the extended state, the hydrostatic bearing 100 typically serves as a so-called master bearing.

In the extended state, the upper member 160 and the lower member 150, respectively, are passive. In the extended state, the applied external load W is, at least mainly, and typically entirely, supported by the load-carrying unit 120.

Neither the piston of the lower member 150 nor the piston of the upper member 160 are active when the lower member 150 is in its extended state and the hydraulic system is shut off.

In the retracted state (shown in FIG. 1), typically the prevailing state during operation of the hydrostatic bearing, the upper member 160 may carry the external load W by means of the pressurizing fluid. In the extended state (shown in FIG. 2), typically the prevailing state during non-operation of the hydrostatic bearing, the upper member 160 may be supported by the lower member 150 which in turn may be supported by the load-carrying unit 120. In the extended state, the upper member 160 may only carry the external load W by assistance of the load-carrying unit 120.

The present invention offers a safe solution, where the external load W may be supported by the hydrostatic bearing not only upon supply of pressurizing fluid, but also if the supply of pressurizing fluid to e.g. the upper member is interrupted.

The hydrostatic bearing 100 is preferably arranged such that the external load W is applied along the central axis A extending through the center of the upper member 160 and of the lower member 150, respectively.

Figure 3:
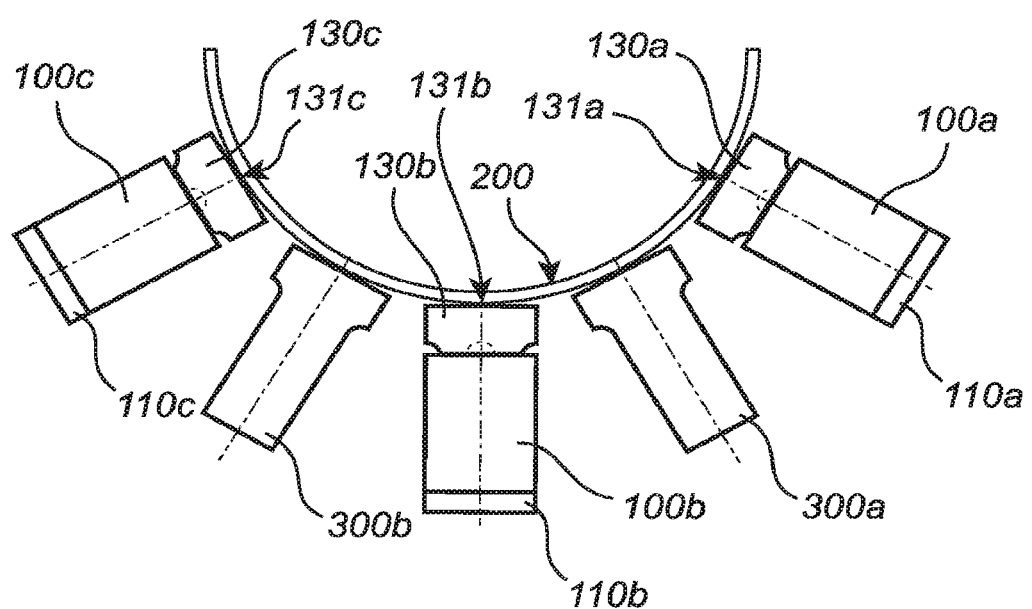
FIG. 3 shows a bearing design for supporting an optical support structure of a telescope in a cross-sectional side view, the bearing design comprising hydrostatic bearings according to an embodiment of the present invention.

In FIG. 3, a bearing design for supporting an optical support structure of a telescope comprising hydrostatic bearings 100a-c according to an embodiment of the present invention is shown in a cross-sectional side view. The hydrostatic bearings 100a-c are combined with conventional bearings 300a-b, such as conventional slave bearings and/or conventional master bearings. The bearings are arranged about the periphery of a raceway 200 of the optical support structure of the telescope. Typically, the bearings 100a-c, 300a-b are uniformly distributed about the periphery of the raceway 200.

The first surfaces 131a-c of the head parts 130a-c of the hydrostatic bearings 100a-c faces the raceway 200. Typically, the first surfaces 131a-c of the head parts 130a-c of the hydrostatic bearings 100a-c are in either direct contact with the raceway 200 or indirect contact via a film of lubricating fluid. The foot parts 110a-c of the hydrostatic bearings 100a-c faces away from the raceway 200.

To conclude, the present invention relates to a hydrostatic bearing comprising a foot part supporting a load-carrying unit, a head part, and body part forming a lower chamber and an upper chamber. A lower member is supported by the load-carrying unit and arranged inside the lower chamber. An upper member is controllable by a pressurizing fluid and arranged inside the upper chamber. The lower member is controllably moveable along a central axis of the hydrostatic bearing between a retracted state, where the lower member is distanced from the upper member, and an extended state, where the lower member is in contact with the upper member. The hydrostatic bearing according to the present invention possesses advantages of both a conventional slave bearing and a conventional master bearing.

Additionally, variations to the disclosed example embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A hydrostatic bearing for supporting a telescope comprising:
   a foot part supporting a load-carrying unit;
   a head part having a first head part surface adapted to receive an external load, and a second head part surface opposite to the first head part surface; a body part arranged in between the foot part and the head part, the body part forming a lower chamber and an upper chamber, the upper chamber being provided with an upper chamber inlet for an upper chamber pressurizing fluid;
   a lower member supportable by the load-carrying unit and arranged inside the lower chamber, the lower member providing a first lower member end surface facing away from the load-carrying unit, and a second lower member end surface facing the load-carrying unit; and
   an upper member arranged inside the upper chamber, the upper member providing a first upper member end surface facing the second head part surface, and a second upper member end surface facing the first lower member end surface;
   wherein the lower member is moveable along a central axis (A) between a retracted state and an extended state,
   wherein when the lower member is in the retracted state, the first lower member end surface is distanced from the second upper member end surface, and
   wherein when the lower member is in the extended state, the first lower member end surface is in contact with the second upper member end surface.

2. The hydrostatic bearing according to claim 1, wherein the lower member comprises a lower hydraulic piston compressing the load-carrying unit when the lower member is in the retracted state.

3. The hydrostatic bearing according to claim 1, wherein the upper member comprises an upper hydraulic piston supporting the applied external load when the lower member is in the retracted state.

4. The hydrostatic bearing according to claim 1, wherein the head part further comprises a main recess for a lubricating fluid being arranged on the first head part surface.

5. The hydrostatic bearing according to claim 4, further comprising a pump for supplying the lubricating fluid to the main recess.

6. The hydrostatic bearing according to claim 5, wherein the pump is arranged external to the head part.

7. The hydrostatic bearing according to claim 1, wherein the head part further comprises at least one sub-recess being connected to a main recess, wherein the at least one sub-recess also is arranged on the first head part surface.

8. The hydrostatic bearing according to claim 7, wherein the head part comprises four sub-recesses being symmetrically arranged about the main recess.

9. The hydrostatic bearing according to claim 1, wherein the lower chamber is provided with a lower chamber inlet for a lower chamber pressurizing fluid.

10. The hydrostatic bearing according to claim 1, wherein the load-carrying unit consists of at least one mechanical spring.

11. A telescope arrangement comprising:
at least one hydrostatic bearing having a foot part supporting a load-carrying unit; a head part having a first head part surface adapted to receive an external load (W), and a second head part surface opposite to the first head part surface;
a body part arranged in between the foot part and the head part, the body part forming a lower chamber and an upper chamber, the upper chamber being provided with an upper chamber inlet for an upper chamber pressurizing fluid;
a lower member supportable by the load-carrying unit and arranged inside the lower chamber, the lower member providing a first lower member end surface facing away from the load-carrying unit, and a second lower member end surface facing the load-carrying unit; and
an upper member arranged inside the upper chamber, the upper member providing a first upper member end surface facing the second head part surface, and a second upper member end surface facing the first lower member end surface;
wherein the lower member is moveable along a central axis (A) between a retracted state and an extended state,
wherein when the lower member is in the retracted state, the first lower member end surface is distanced from the second upper member end surface, and wherein when the lower member is in the extended state, the first lower member end surface is in contact with the second upper member end surface.

* * * * *